United States Patent [19]
Satou

[11] Patent Number: 5,335,550
[45] Date of Patent: Aug. 9, 1994

[54] SEMICONDUCTOR PRESSURE SENSOR INCLUDING MULTIPLE SILICON SUBSTRATES BONDED TOGETHER AND METHOD OF PRODUCING THE SAME

[75] Inventor: Kimitoshi Satou, Itami, Japan

[73] Assignee: Mitsubishi Denki Kabushiki Kaisha, Tokyo, Japan

[21] Appl. No.: 903,262

[22] Filed: Jun. 24, 1992

[30] Foreign Application Priority Data

Apr. 1, 1992 [JP] Japan ................... 4-079617

[51] Int. Cl.⁵ ............................... G01L 9/06
[52] U.S. Cl. .......................... 73/727; 29/621.1
[58] Field of Search .......... 73/720, 721, 726, 727; 338/4, 42; 29/621.1; 156/644, 651, 653, 657; 437/228, 233, 901, 921

[56] References Cited

U.S. PATENT DOCUMENTS

| | | | |
|---|---|---|---|
| 4,766,666 | 8/1988 | Sugiyama et al. | 29/610 |
| 4,771,639 | 9/1988 | Saigusa et al. | 73/727 |
| 4,881,410 | 11/1989 | Wise et al. | 73/724 |
| 4,930,353 | 6/1990 | Kato et al. | 73/727 |
| 5,070,735 | 12/1991 | Reichert et al. | 73/727 |
| 5,145,810 | 9/1992 | Matsumi | 73/727 |

FOREIGN PATENT DOCUMENTS 2830121 1/1980 Fed. Rep. of Germany .
3743080 7/1988 Fed. Rep. of Germany .

Primary Examiner—Richard E. Chilcot, Jr.
Assistant Examiner—William L. Oen
Attorney, Agent, or Firm—Leydig Voit & Mayer

[57] ABSTRACT

A small, precise semiconductor pressure sensor has a flat, thin diaphragm of uniform thickness that is formed by a simple process. A first silicon substrate and a second silicon substrate are bonded to each other with an interface insulating film interposed between them and circuitry including gauge resistors is fabricated on the primary surface of the second silicon substrate. The interface insulating film may be disposed in the recess of a vacuum chamber and may have a two layer structure. If alignment marks are formed, the circuitry can be accurately formed relative to the vacuum chamber.

14 Claims, 15 Drawing Sheets

F I G. 13
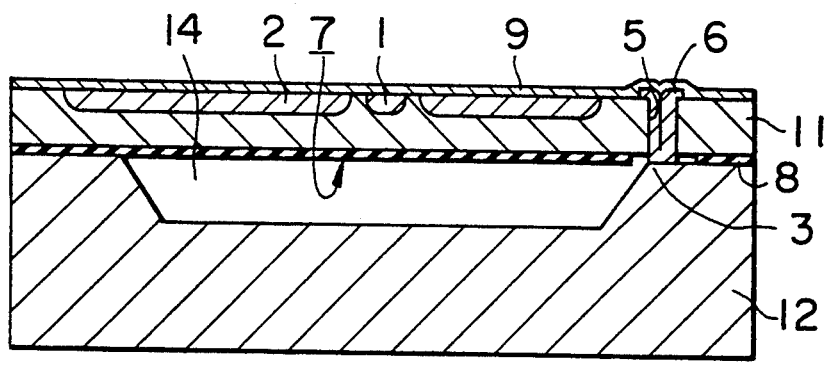
F I G. 14
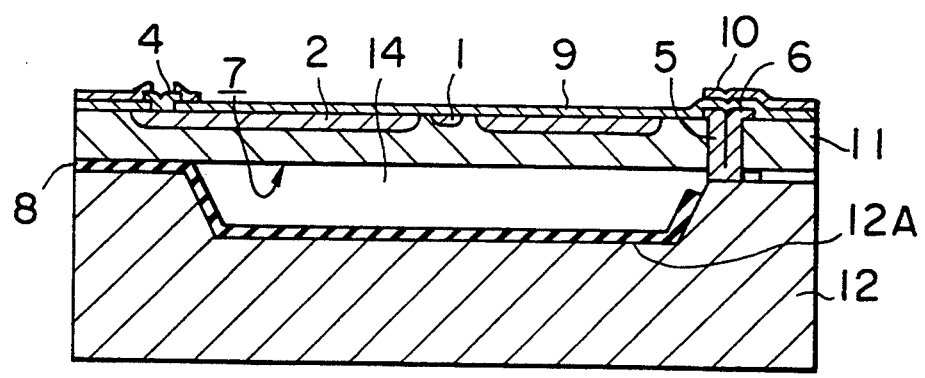
F I G. 15
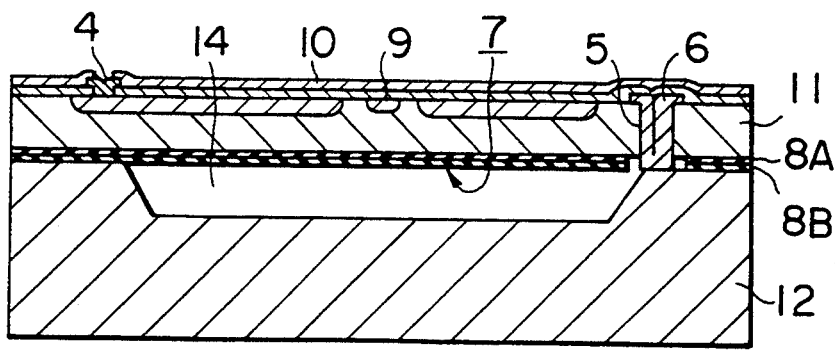

F I G. 36
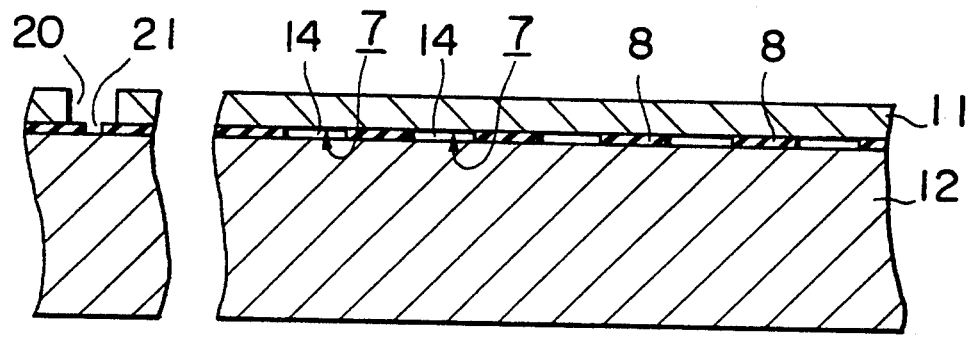

SEMICONDUCTOR PRESSURE SENSOR INCLUDING MULTIPLE SILICON SUBSTRATES BONDED TOGETHER AND METHOD OF PRODUCING THE SAME

BACKGROUND OF THE INVENTION

1. Field of the Invention

The present invention relates to a semiconductor pressure sensor and a method of producing the same. More specifically, the present invention relates to a semiconductor pressure sensor which may be installed in a vehicle or the like in order to measure pressure such as atmospheric pressure, and also relates to a method of producing such a semiconductor pressure sensor.

2. Description of the Related Art

FIGS. 37 and 38 show a conventional semiconductor pressure sensor, FIG. 37 being a plan view, and FIG. 38 being a side sectional view taken along the line B—B shown in FIG. 37. Referring to these Figures, a silicon substrate 11 comprises a silicon substrate having the crystal orientation (1 0 0) is for the purposes of increasing the sensitivity of the sensor with which it measures pressure and including a diaphragm 7 formed by anisotropically etching one surface (reverse surface) of the substrate 11. Gauge resistors 1 are formed at certain positions on the other surface (front surface) which are in the vicinity of edge portions 3 of the diaphragm 7 where the diaphragm 7 deforms most greatly when it is subjected to a change in pressure, the position of each gauge resistor 1 thus corresponding to one of the sides defined by the diaphragm edges. The gauge resistors 1 are interconnected by diffused wirings 2 into a bridge circuit. When the diaphragm 7 deforms due to a change in pressure, the deformation is converted by the bridge-connected gauge resistors 1 into an electrical signal.

Each of the diffused wirings 2 is connected to a metal electrode 4, which is in turn connected to an external circuit. A silicon oxide film 9 is disposed on the front surface of the silicon substrate 11, and serves as a mask during the formation of the gauge resistors 1, the diffused wirings 2, etc., as well as a protective film of the sensor. A glass coating 10 for protecting the whole of the front surface is disposed on the silicon oxide film 9. The diaphragm 7 is formed by, after the device on the front surface has been fabricated, etching the substrate 11 from the reverse surface in correspondence with the positions of the gauge resistors 1. The diaphragm 7 is the portion of the sensor which responds to pressure by deflecting.

The conventional semiconductor pressure sensor having the above-described construction is produced as shown in FIGS. 39 through 42, which are side sectional views of the sensor being produced. First, as shown in FIG. 39, a silicon substrate 11 composed of a single-crystal having the crystal orientation (1 0 0) is prepared. Subsequently, a device is fabricated on the front surface of the silicon substrate 11. Specifically, a silicon oxide film 9 is formed on the relevant surface of the substrate 11 by thermal oxidation. After forming openings in the silicon oxide film 9 at positions corresponding to the positions at which diffused wirings 2 are to be formed, the silicon oxide film 9 is used as a mask, through which impurities, such as boron, are diffused, thereby forming the diffused wirings 2 having a low resistivity. Further, four gauge resistors 1 are formed. The gauge resistors 1 are bridge-connected by diffused wirings 2 (FIG. 40).

Subsequently, certain portions of the diffused wirings 2 are exposed, and metal electrodes 4 are formed on these portions. Thereafter, the device-fabricated surface of the semiconductor pressure sensor is substantially entirely covered with a glass coating 10, such as a silicon nitride film (FIG. 41). Subsequently, an etching mask 13, such as a silicon nitride film, is formed on a part of the reverse surface of the silicon substrate 11 (FIG. 42) in such a manner that the position of the gauge resistors 1 on the front surface will correspond to that region of a diaphragm 7 (formed later) at which the diaphragm 7 is able to deform most greatly when subjected to a change in pressure. Subsequently, an anisotropic etching employing an etchant (such as an alkali-type etchant) is effected from the reverse surface of the silicon substrate 11 until the required thickness of the diaphragm 7 is achieved.

The region at which the diaphragm 7 deforms most greatly when subjected to a change in pressure comprises the edge portions 3 of the diaphragm 7 shown in FIG. 38. Hence, the gauge resistors 1 on the front surface of the semiconductor pressure sensor are positioned above these edge portions 3.

The conventional semiconductor pressure sensor has the following drawbacks: because there is a risk that the thickness of the silicon substrate 11 (silicon wafer) will vary between various portions thereof, and a risk that the etching rate will vary between a plurality of batches, between sensors within one batch, and/or between various portions of the wafer surface, and because the etching is effected to a relatively great depth, it is difficult to control the thickness of the diaphragm 7 with a high level of precision, and the operational efficiency is poor; since the diaphragm 7 is formed in the final stage of the sensor production, it is necessary, at this time, to completely protect the wafer surface; and due to the fact that anisotropic etching has a certain angle at which the etching proceeds and that the extent to which the diaphragm 7 can be made thin is inevitably limited, it is difficult to make the sensor small.

SUMMARY OF THE INVENTION

Accordingly, an object of the present invention is to provide a semiconductor pressure sensor and a method of producing the same, the sensor being small and having a high level of precision.

In order to achieve the above object, according to a first aspect of the present invention, there is provided a semiconductor pressure sensor comprising: a first silicon substrate having a primary surface formed with a recess serving as a vacuum chamber; a second silicon substrate having a primary surface on which a device including diffused resistors and diffused wirings is disposed, and a secondary surface bonded to the primary surface of the first silicon substrate; an interface insulating film interposed between the primary surface of the first silicon substrate and the secondary surface of the second silicon substrate; and a silicon oxide film disposed on the primary surface of the second silicon substrate in order to protect the device.

According to the first aspect of the present invention, there is provided another semiconductor pressure sensor comprising: a first silicon substrate; a second silicon substrate having a primary surface on which a device including diffused resistors and diffused wirings is disposed, and a secondary surface bonded to a primary surface of the first silicon substrate; an interface insulating film interposed between the primary surface of the first silicon substrate and the secondary surface of the second silicon substrate, the interface insulating film including a portion defining a vacuum chamber and portions forming alignment marks; alignment mark observation windows disposed at positions of the second silicon substrate corresponding to the respective positions of the alignment marks; and a silicon oxide film disposed on the primary surface of the second silicon substrate in order to protect the device and the alignment mark observation windows.

In order to achieve the above-stated object, according to a second aspect of the present invention, there is provided a method of producing a semiconductor pressure sensor, the method comprising: forming a recess at a primary surface of a first silicon substrate to constitute a vacuum chamber; bonding the primary surface of the first silicon substrate to one surface of a second silicon substrate with an interface insulating film interposed between the surfaces, the surfaces being bonded together in such a manner that the recess is at a central location of the surfaces; machining the second silicon substrate from the other surface thereof until the thickness of the second silicon substrate is reduced to a predetermined diaphragm thickness; forming openings through certain portions of the second silicon substrate at positions thereof which are adjacent to the top edge of the recess, thereby exposing certain portions of the interface insulating film; etching the exposed portions of the interface insulating film, thereby opening the recess to the exterior of the sensor being produced; closing the openings with a film deposited in a reduced-pressure atmosphere, thereby transforming the recess into the vacuum chamber; forming a silicon oxide film on a primary surface of the second silicon substrate which has been formed by the machining; and fabricating, on the primary surface of the second silicon substrate, a device including diffused resistors and diffused wirings while employing the silicon oxide film as a mask, the silicon oxide film thereafter serving as a protective film.

According to the second aspect of the present invention, there is provided another method of producing a semiconductor pressure sensor, the method comprising: forming alignment mark observation window holes at one surface of a second silicon substrate; forming, on a primary surface of a first silicon substrate, a recess which is to constitute a vacuum chamber; forming, on the primary surface of the first silicon substrate, alignment marks for observing the position of the recess; bonding the primary surface of the first silicon substrate to the surface of the second silicon substrate in a reduced-pressure atmosphere with an interface insulating film interposed between the surfaces, the bonding causing the recess to be transformed into the vacuum chamber; machining the second silicon substrate from the other surface thereof to open alignment mark observation windows through which the alignment marks can be observed and to reduce the thickness of the second silicon substrate to a predetermined diaphragm thickness; and fabricating, on a primary surface of the second silicon substrate which has been formed by the machining, a device including diffused resistors, diffused wirings, metal electrodes and a surface protective film, the elements of the device being fabricated in correspondence with the position of the top of the vacuum chamber.

BRIEF DESCRIPTION OF THE DRAWINGS

FIGS. 3 through 13 are side sectional views (taken along similar lines) for illustrating a manner of producing the sensor shown in FIG. 1, in which FIG. 3 shows a second silicon substrate;

FIG. 4 shows an interface insulating film on a secondary surface of the second silicon substrate;

FIG. 5 shows a first silicon substrate;

FIG. 6 shows an etching mask on the surfaces of the first silicon substrate;

FIG. 7 shows a recess in the first silicon substrate;

FIG. 8 shows the first and second silicon substrates bonded to each other with the interface insulating film interposed therebetween;

FIG. 9 shows the second silicon substrate machined from the other surface thereof in such a manner that the second silicon substrate has a predetermined thickness;

FIG. 10 shows etching openings through the second silicon substrate;

FIG. 11 shows isotropic etching from the etching openings so that the interface insulating film is side-etched;

FIG. 12 shows vacuum chamber seals deposited over the etching openings; and

FIG. 13 shows a device fabricated on a primary surface of the second silicon substrate;

FIG. 14 is a side sectional view of a semiconductor pressure sensor having an interface insulating film in the recess of the first silicon substrate;

FIG. 15 is a side sectional view of a semiconductor pressure sensor having a glass coating over substantially the entire primary surface of the second silicon substrate and also having a two-layer interface insulating film;

FIGS. 20 through 26 are side sectional views for illustrating a manner of producing the sensor shown in FIG. 19, in which FIG. 20 shows a second silicon substrate;

FIG. 21 shows an etching mask on a secondary surface of the second silicon substrate;

FIG. 22 shows alignment mark observation window holes in the second silicon substrate;

FIG. 23 shows a first silicon substrate;

FIG. 24 shows an interface insulating film on a primary surface of the first silicon substrate;

FIG. 25 shows the first and second silicon substrates bonded together; and

FIG. 26 shows the second silicon substrate machined from the other surface thereof in such a manner that the second silicon substrate has a predetermined thickness;

FIG. 36 is a side sectional view of a semiconductor pressure sensor having a plurality of vacuum chambers disposed between first and second silicon substrates;

FIGS. 39 through 42 are side sectional views (taken along similar lines) illustrating a manner of producing the sensor shown in FIG. 37, in which FIG. 39 shows a silicon substrate;

FIG. 40 shows a device fabricated on a front surface of the silicon substrate;

FIG. 41 shows a glass coating on the surface of the device; and

FIG. 42 shows an etching mask on the reverse surface of the silicon substrate.

DESCRIPTION OF THE PREFERRED EMBODIMENTS

Embodiment 1

Figure 1:
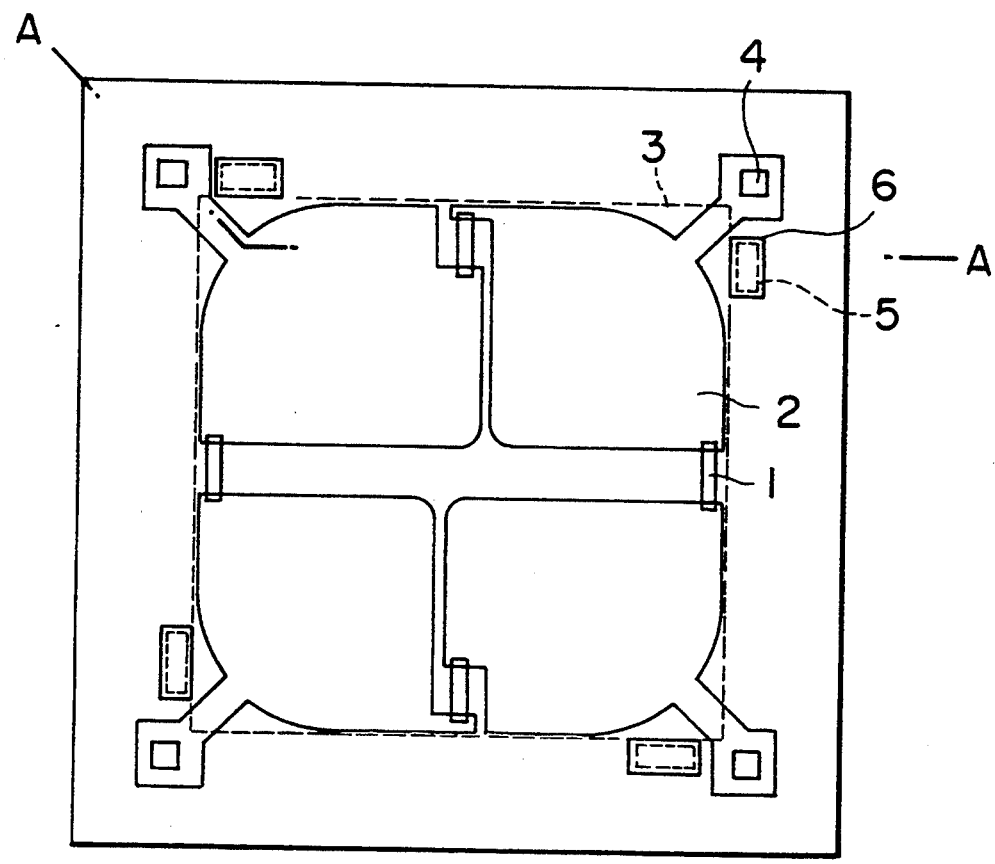
FIG. 1 is a plan view of a semiconductor pressure sensor according to a first embodiment of the present invention.
Figure 2:
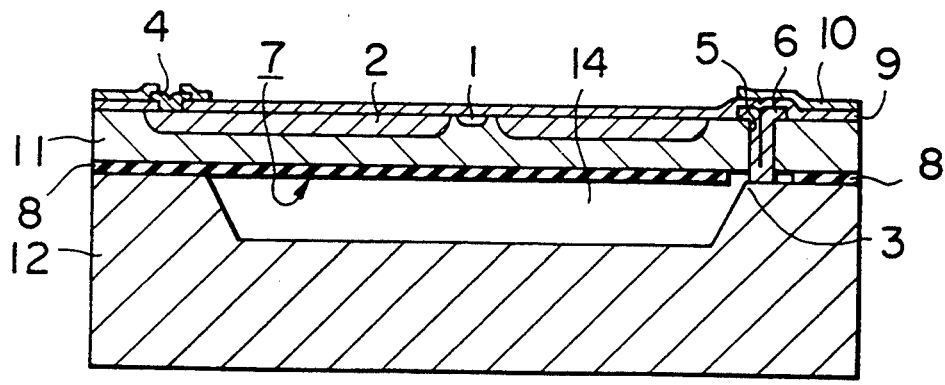
FIG. 2 is a side sectional view of the sensor shown in FIG. 1, which is taken along the line A—A shown in FIG. 1.
Figure 3:
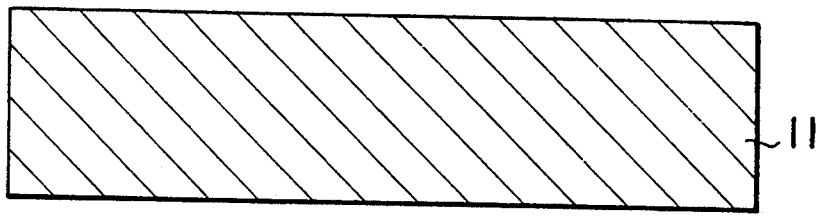

FIGS. 1 and 2 show a semiconductor pressure sensor according to a first embodiment of the present invention, FIG. 1 being a plan view, and FIG. 2 being a side sectional view taken along the line A—A shown in FIG. 1. In these and the other Figures referred to later, identical reference numerals are used to denote component parts which are the same as or correspond to each other, and their descriptions will be omitted when appropriate.

Referring to FIGS. 1 and 2, the sensor includes a first (single-crystal) silicon substrate 12 and a second (single-crystal) silicon substrate 11. The first and second silicon substrates 12 and 11 are bonded to each other with an interface insulating film 8 interposed therebetween, and they are bonded in such a manner that a vacuum chamber 14 is formed therebetween, the substrates 11 and 12 thus constituting a single substrate-body. The vacuum chamber 14 is defined by bonding that surface (primary surface) of the first silicon substrate 12 formed with a recess which is to constitute the vacuum chamber 14 onto the mated surface (secondary surface) of the second silicon substrate 11. Etched openings 5 (only one of which is shown in FIG. 2) are formed through certain portions of the second silicon substrate 11. The etched openings 5 are used, during the production of the sensor, for communication of the recess with the outside of the substrate body, and are then closed with vacuum chamber seals 6 made of a film deposited in a reduced-pressure atmosphere.

Figure 4:
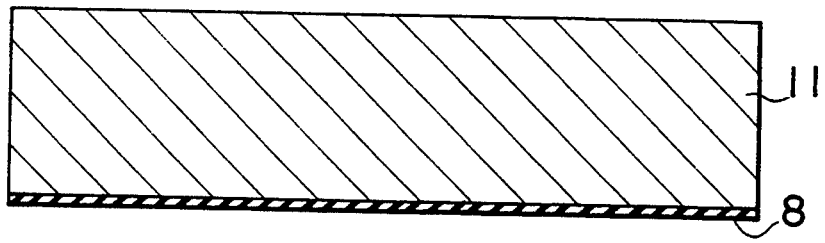
Figure 5:
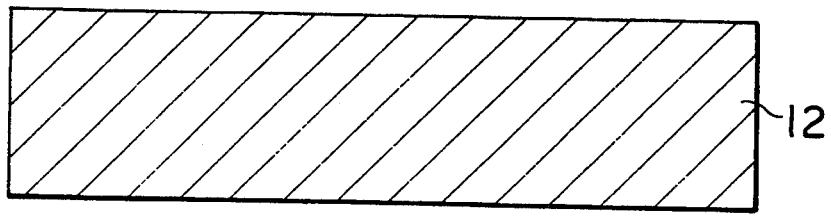
Figure 6:
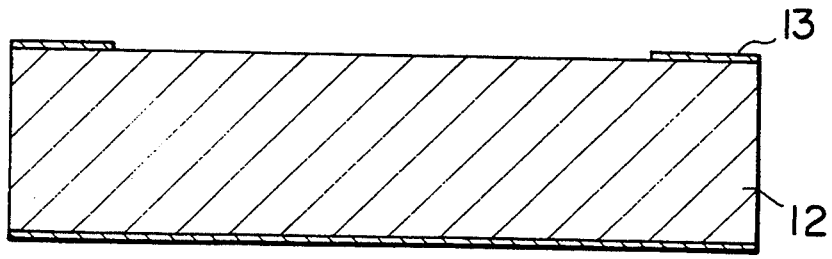
Figure 7:
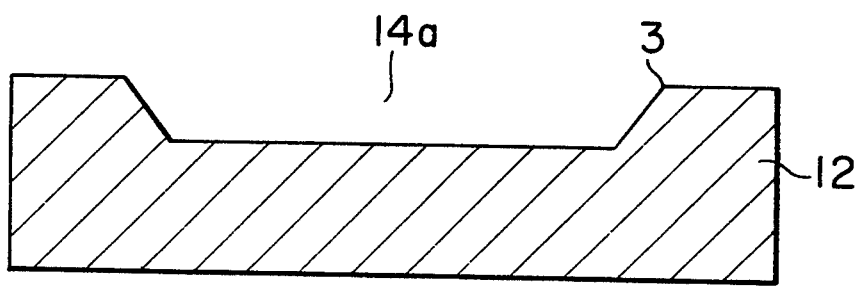

The semiconductor pressure sensor having the above construction is produced in the manner shown in FIGS. 3 through 13. A second silicon substrate 11 is prepared (FIG. 3), and an interface insulating film 8, such as a silicon oxide film, is formed on the secondary surface of the second silicon substrate 11 (FIG. 4). A first silicon substrate 12 is prepared (FIG. 5), and an etching mask 13, for forming the primary surface of the first silicon substrate 12 with a recess 14a which is to constitute a vacuum chamber 14, is formed on the primary and secondary surfaces of the first silicon substrate 12 (FIG. 6). Etching is performed so as to form the recess 14a in the first silicon substrate 12, and thereafter, the etching mask 13 is removed (FIG. 7).

Figure 8:
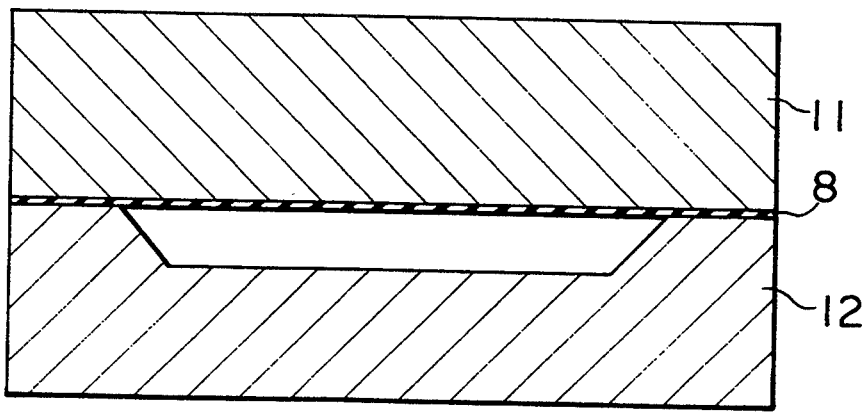
Figure 9:
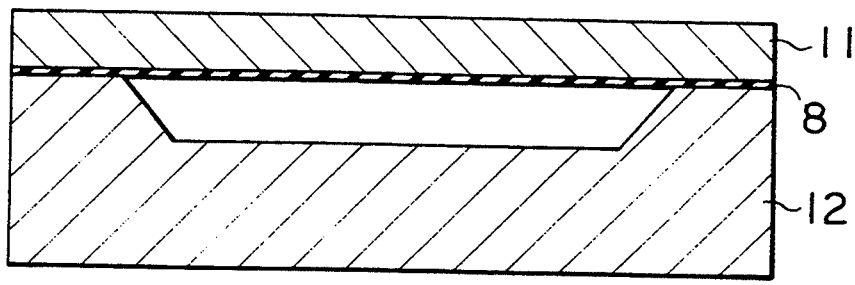
Figure 10:
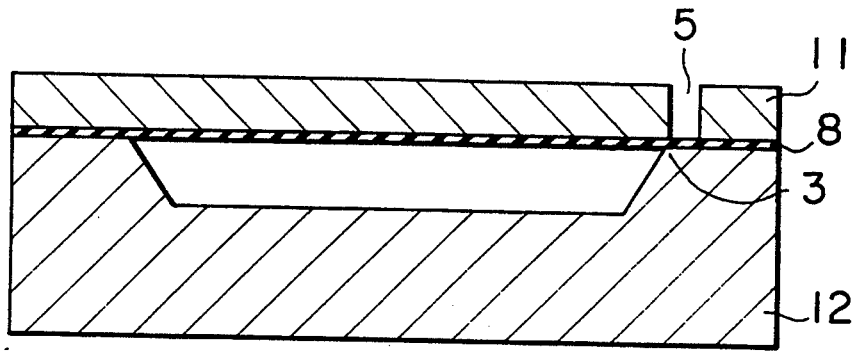
Figure 11:
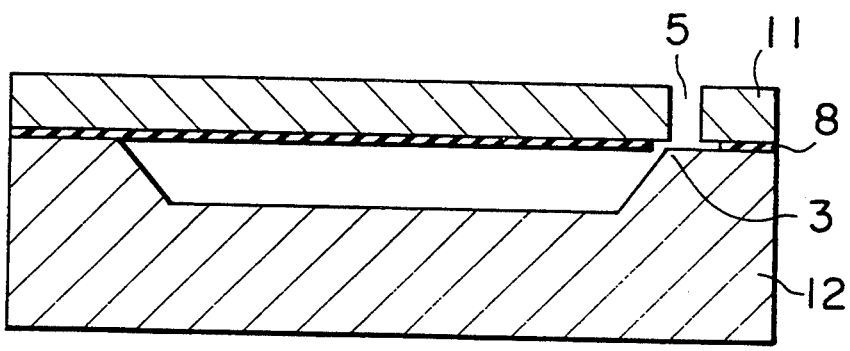

Subsequently, the second silicon substrate 11 and the first silicon substrate 12 are bonded to each other with the interface insulating film 8 therebetween (FIG. 8). Thereafter, part of the second silicon substrate 11 is removed at the non-bonded surface of the second silicon substrate. Since the sensitivity of the pressure sensor is determined by the final thickness of the second silicon substrate 11, the material removal, i.e., machining, is controlled such that the required thickness is achieved (FIG. 9). The machining results in a primary surface of the second silicon substrate 11 being formed. Then, etched openings 5 are formed by etching through certain portions of the second silicon substrate 11 which are adjacent to the top edge 15 of the recess 14a (FIG. 10). Further, isotropic etching from the etched openings 5 side-etches the interface insulating film 8 (FIG. 11).

The formation of the openings 5 and the side-etching of the film 8 open the recess 14a to the outside of the substrate body.

Figure 12:
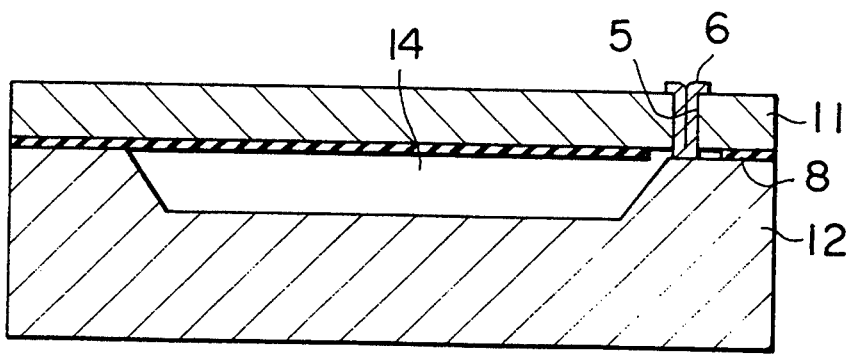

Subsequently, a film deposition is performed in a reduced-pressure atmosphere so as to form vacuum chamber seals 6 over the etched openings 5, thereby transforming the recess 14a into the vacuum chamber 14 (FIG. 12). Thereafter, a device is fabricated on the primary surface of the second silicon substrate 11, as shown in FIG. 13. Specifically, gauge resistors 1 are formed by employing a patterned silicon oxide film 9 as a mask at certain positions on the primary surface of the substrate 11 which are in the vicinity of the top edge 15 of the vacuum chamber 14 where the second silicon substrate 11 deforms most greatly when subjected to a change in pressure. The gauge resistors 1 comprise four gauge resistors which are positioned in correspondence with the four sides defined by the top edge 15 of the vacuum chamber 14, and which are bridge-connected by diffused wirings 2.

The diffused wirings 2 are formed by causing, in a manner similar to that in the formation of the gauge resistors 1, impurities to diffuse through the patterned silicon oxide film 9 serving as a mask, and then annealing. An oxidation is effected simultaneously with the annealing, so that the silicon oxide film 9 recovers its unpatterned state and is now able to serve as a protective film on the resistors 1 and the wirings 2.

Subsequently, a glass coating 10 is formed in order to protect the primary surface of the second silicon substrate 11 on which the device is fabricated. A part of the glass coating 10 is removed, however, from a certain location of the primary surface which is above the vacuum chamber 14, thereby completing the production of the semiconductor pressure sensor.

Although in the above-described first embodiment the interface insulating film 8 is disposed on the secondary surface of the second silicon substrate 11, the film 8 may be alternatively formed, as shown in FIG. 14, in a recess 12A of the first silicon substrate 12. In this case, since the interface insulating film 8 is not disposed on the silicon substrate 11 which is relatively thin and which is disposed over the vacuum chamber 14, the second silicon substrate 11 is prevented from being influenced by any stress or the like of the interface insulating film 8, thereby enabling the sensor to exhibit an excellent characteristic.

FIG. 15 shows a combination of certain modifications of the first embodiment. Although in the first embodiment the glass coating 10 covers substantially the entire primary surface of the second silicon substrate 11 except for a location (above-chamber location) of the surface which is above the vacuum chamber 14, the glass coating 10 may be alteratively disposed over substantially the whole of the primary surface of the second silicon substrate 11 including the above-chamber location. Further, although in the first embodiment the interface insulating film 8 is composed of a single layer, the film 8 may be alternatively composed of two layers of different materials. Among films which may be used to constitute the two layers, a silicon oxide film and a silicon nitride film are preferable examples. If the interface insulating film 8 is composed of two layers 8A and 8B of materials having different characteristics with respect to film stress, it is possible to reduce the amount of warpage of the silicon on insulator (SOI) substrate, thereby making it possible to reduce the risk of defects or dislocation. Furthermore, since the sensor shown in FIG. 15 has a glass coating 10 on substantially the whole of the primary surface of the second silicon substrate including the above-chamber location, it is possible to provide full protection for the surface.

Figure 16:
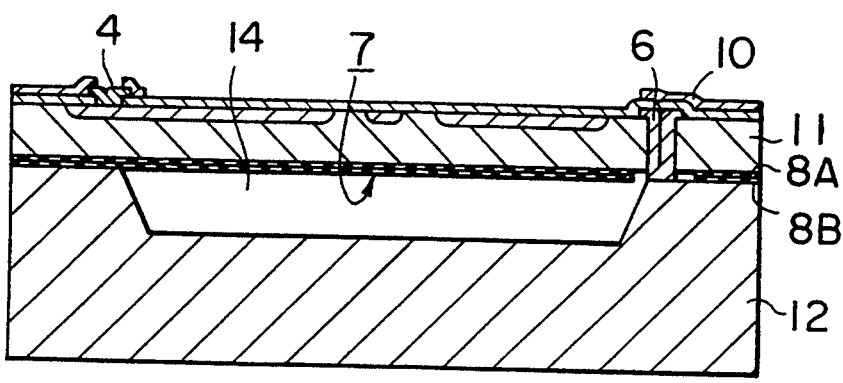
FIG. 16 is a side sectional view of a semiconductor pressure sensor having a two-layer interface insulating film.
Figure 17:
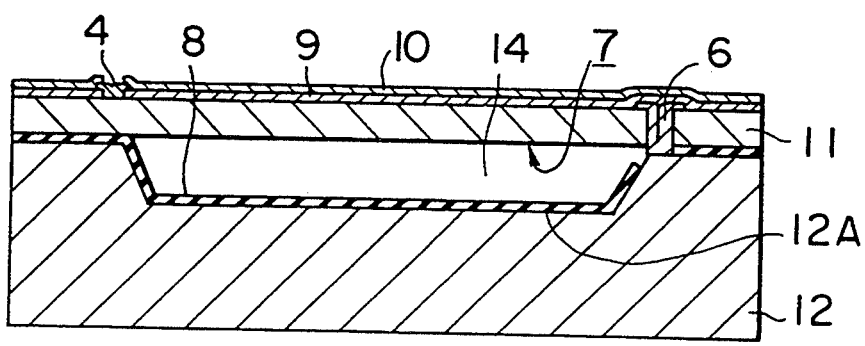
FIG. 17 is a side sectional view of a semiconductor pressure sensor having an interface insulating film in the recess of the first silicon substrate and also having a glass coating over substantially the entire primary surface of the second silicon substrate.

If, as shown in FIG. 16, a semiconductor pressure sensor has a glass coating 10, a part of which is removed from the above-chamber location of the primary surface of the second silicon substrate 11, the sensor is free from influences which can be caused by film stress, etc., and exhibits an excellent characteristic. In another combination of modifications of the first embodiment, shown in FIG. 17, an interface insulating film 8 is disposed in the recess 12A of the first silicon substrate 12, and a glass coating 10 is disposed over substantially the entire primary surface of the second silicon substrate 11. The effect provided in this case is a combination of the some of the above-described effects: the absence of the interface insulating film 8 from the second silicon substrate 11 disposed over the vacuum chamber 14 prevents the relatively thin second silicon substrate 11 from being influenced by film stress, etc., thereby enabling the sensor to exhibit excellent characteristics; and the glass coating 10 over substantially the entire primary surface of the second silicon substrate 11 fully protects the surface.

Figure 18:
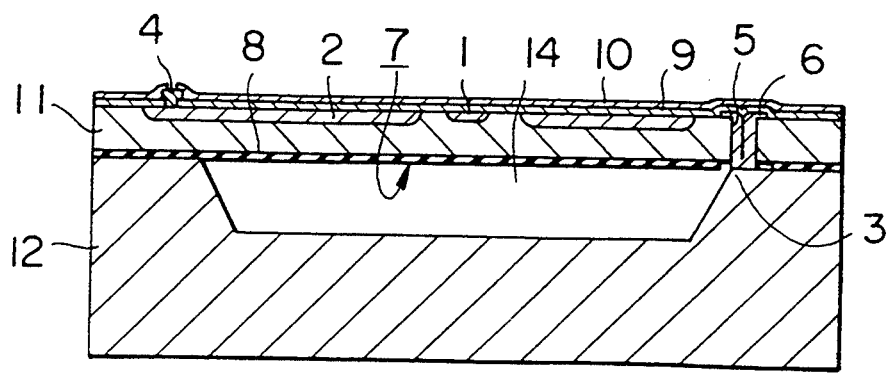
FIG. 18 is a side sectional view of a semiconductor pressure sensor having a glass coating over substantially the entire primary surface of the second silicon substrate.

The semiconductor pressure sensor shown in FIG. 18 is simply distinguished from the first embodiment in that a glass coating 10 is disposed over substantially the entire primary surface of the second silicon substrate 11 without removing, as in the first embodiment, a part of the coating 10 from the above-chamber location of the surface, thereby fully protecting the surface.

Embodiment 2

Figure 19:
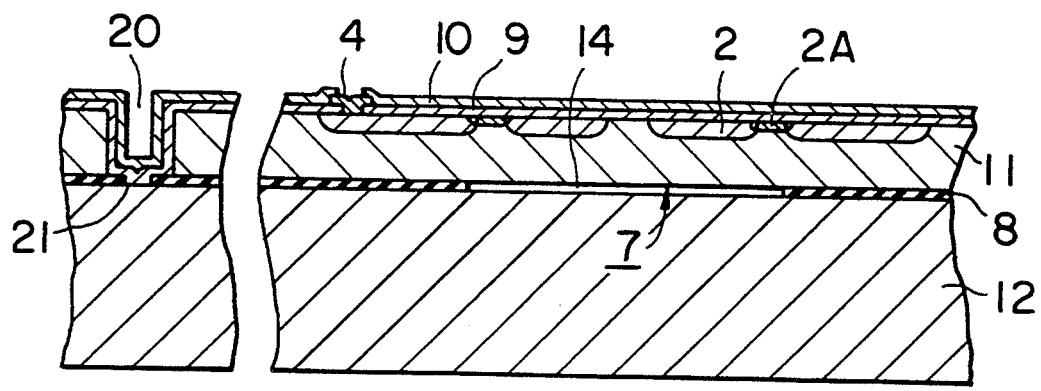
FIG. 19 is a side sectional view of a semiconductor pressure sensor according to a second embodiment of the present invention.
Figure 20:
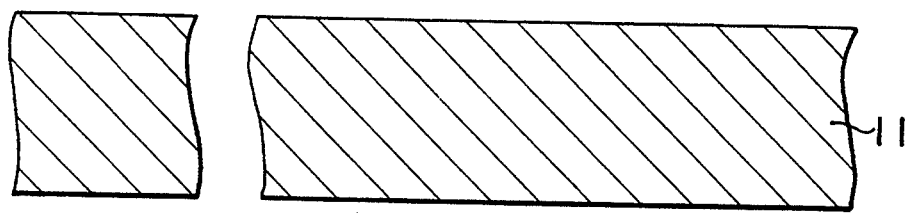
Figure 21:
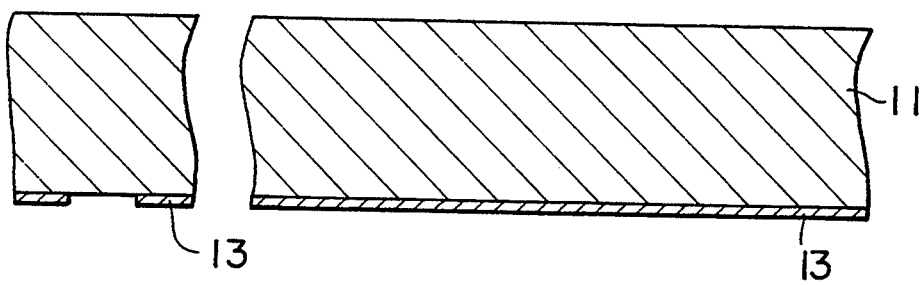

A semiconductor pressure sensor according to a second embodiment of the present invention is shown, in a side sectional view, in FIG. 19. As shown in this Figure, the sensor includes a suitable number of (e.g., two) alignment mark observation windows 20 through a corresponding number of positions of the outer peripheral portion of a second silicon substrate 11. The second silicon substrate 11 is bonded to a first silicon substrate 12 with an interface insulating film 8 therebetween. The bonding is performed in a vacuum in such a manner as to form a vacuum chamber 14 and alignment marks 21. The sensor also includes diffused resistors 2A interconnected by diffused wirings 2 into a bridge circuit.

Figure 22:
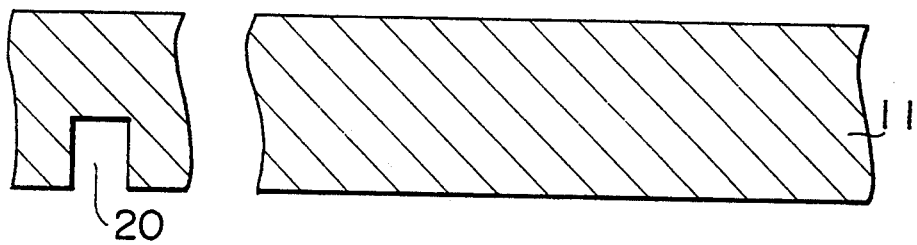
Figure 23:
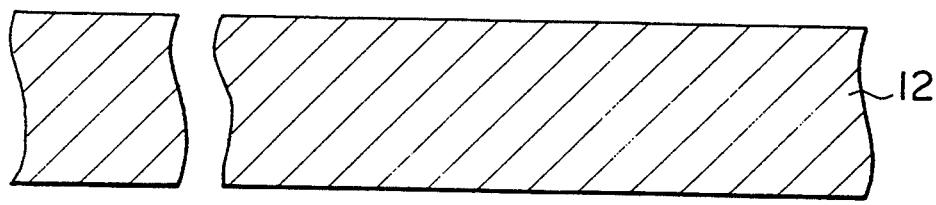
Figure 24:
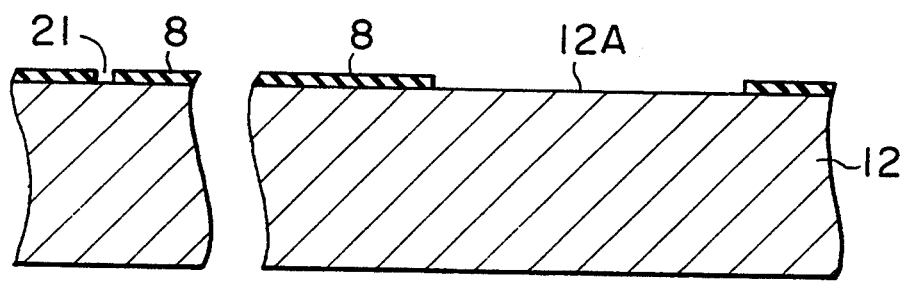

The semiconductor pressure sensor according to the second embodiment is produced in the manner shown in FIGS. 20 to 26 and FIG. 19. A second silicon substrate 11 is prepared (FIG. 20), and an etching mask 13 is formed on one surface (secondary surface) of the substrate 11 (FIG. 21), the mask 13 being suitably patterned for the purpose of forming, at a suitable number of (e.g., two) positions of the outer peripheral portion of the second silicon substrate 11, a corresponding number of alignment mark observation windows 20 through which alignment marks 21 (also formed later) are to be observed. Thereafter, the second silicon substrate 11 is etched through the opening in the etching mask 13. At this time, the substrate 11 is etched from the secondary surface to a depth equal to or greater than the machining depth by which the substrate 11 will be machined later from the other surface thereof. In this way, alignment observation window holes are formed (FIG. 22).

Subsequently, a first silicon substrate 12 is prepared (FIG. 23), and an interface insulating film 8 is formed on one surface (primary surface) of the substrate 12 (FIG.

Figure 25:
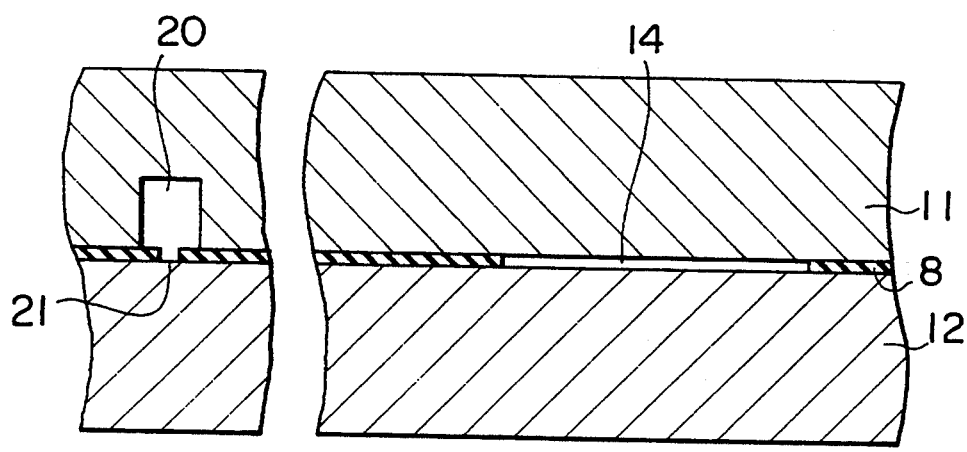

24). The interface insulating film 8 is etched in such a manner as to form a suitable number of (e.g., two) alignment marks 21 which are at corresponding positions of the outer peripheral portion of the first silicon substrate 12, and to simultaneously form a recess 12A which is to constitute a vacuum chamber 14. Thereafter, the respective processed surfaces of the second silicon substrate 11 and the first silicon substrate 12 are brought into contact with each other and bonded together in a vacuum atmosphere (FIG. 25). During the bonding, the substrates are aligned with each other in such a manner that the alignment mark observation window holes 20 of the second silicon substrate 11 coincide with the alignment marks 21 on the first silicon substrate 12. The vacuum chamber 14 is formed by the bonding performed in a vacuum.

Figure 26:
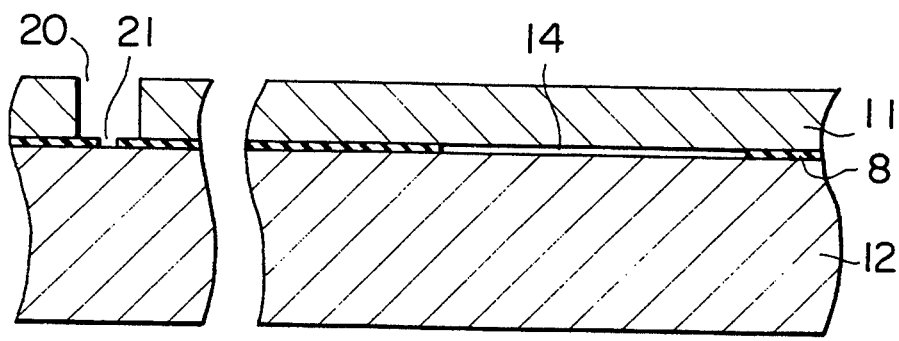

Subsequently, the second silicon substrate 11 is ground to the machining depth from the non-bonded surface thereof. The grinding is performed in such a manner that the alignment mark observation windows 20 are opened and allow the alignment marks 21 to be observed therethrough (FIG. 26). Thereafter, a device is fabricated, as shown in FIG. 19. Specifically, a silicon oxidation film 9 is formed, by thermal oxidation, on the surface (primary surface) of the second silicon substrate 12 which has been formed by the grinding. Then, the silicon oxide film 9 is patterned by forming openings through certain portions thereof which correspond to the positions where diffused wirings 2 are to be formed. While the silicon oxide film 9 serves as a mask, impurities, such as boron, are diffused, thereby forming the diffused wirings 2 having a low resistivity. The forced exposure of the second silicon substrate 11 achieves alignment by utilizing the alignment marks 21 in the interface insulating film 8. The use of the alignment marks 21 enables the position of the recess 12A (i.e., the vacuum chamber 14) after the bonding of the substrates 12 and 11 to be accurately recognized, thereby enabling precise alignment.

Subsequently, openings are formed through certain portions of the silicon oxide film 9 which correspond to the position of the vacuum chamber 14 and which also correspond to the positions where diffused resistors 2A are to be formed. Thereafter, impurities, such as boron, are implanted through the patterned silicon oxide film 9 serving as a mask, thereby forming diffused resistors 2A at positions corresponding to the sides of the vacuum chamber 14, the resistors 2A being interconnected by the diffused wirings 2 into a bridge circuit. Then, certain portions of the silicon oxide film 9 are removed in order to allow connection with an external circuit, and metal electrodes 4 are formed over these portions. Thereafter, substantially the entire surface of the semiconductor pressure sensor is covered with a glass coating 10 such as a silicon nitride film. Finally, those portions of the glass coating 10 on the metal electrodes 4 are removed, thereby completing the production of the semiconductor pressure sensor.

Figure 27:
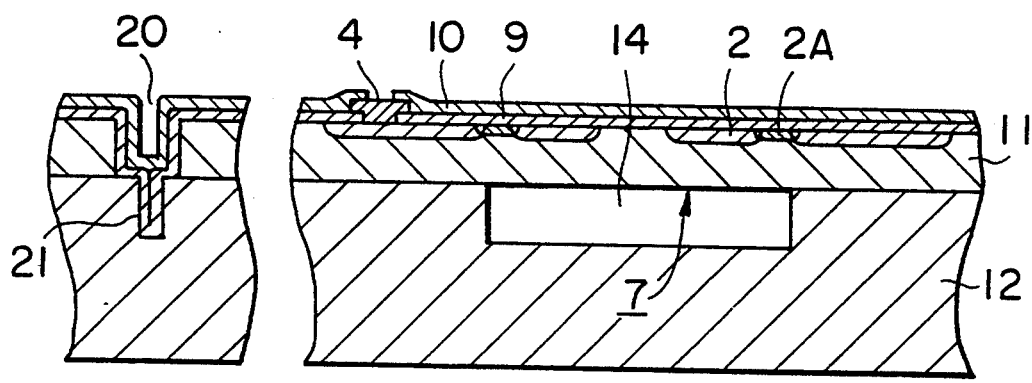
FIG. 27 is a side sectional view of a semiconductor pressure sensor having a recess in the first silicon substrate.

Although in the above-described second embodiment the vacuum chamber 14 is formed by etching a part of the interface insulating film 8, the chamber 14 may be alternatively formed by etching the first silicon substrate 12, as shown in FIG. 27. In this case, since the vacuum chamber 14 is relatively large, it is possible to provide a wide range for the deformation of the diaphragm 7, and hence, to realize a semiconductor pressure sensor having a relatively high sensitivity with respect to pressure. Although the sensor shown in FIG. 27 has no interface insulating film 8, an interface insulating film 8 may be formed between the second silicon substrate 11 and the first silicon substrate 12, as shown in FIG. 28.

Figure 28:
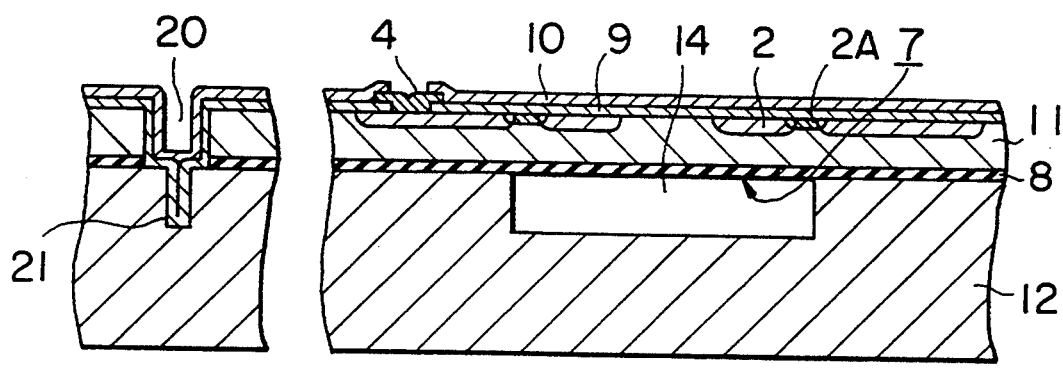
FIG. 28 is a side sectional view of a semiconductor pressure sensor having a recess in the first silicon substrate and also having a second silicon substrate bonded to the first silicon substrate with an interface insulating film interposed therebetween.

Although the semiconductor pressure sensor shown in FIG. 28 has a single-layer interface insulating film, an interface insulating film 8 may have a layered structure constituted by two or more layers of different materials, as shown in FIGS. 29, 32, 34 and 35. For example, if two layers 8A and 8B constituting the layered structure of an interface insulating film 8 consist of films of materials whose characteristics permit the respective influences of the films to be offset by each other, it is possible to reduce the amount of warpage of the first and second silicon substrates 12 and 11, thereby producing a substrate body having relatively few defects. As in the present invention, if a device is fabricated on the second silicon substrate 11 after a vacuum chamber 14 has been formed, the second silicon substrate 11, which lies over the vacuum chamber 14 and which is thin, deforms inward under atmospheric pressure. If problems arise from such deformation, they can be prevented by constructing the interface insulating film as a film or film structure deforming upward.

Figure 29:
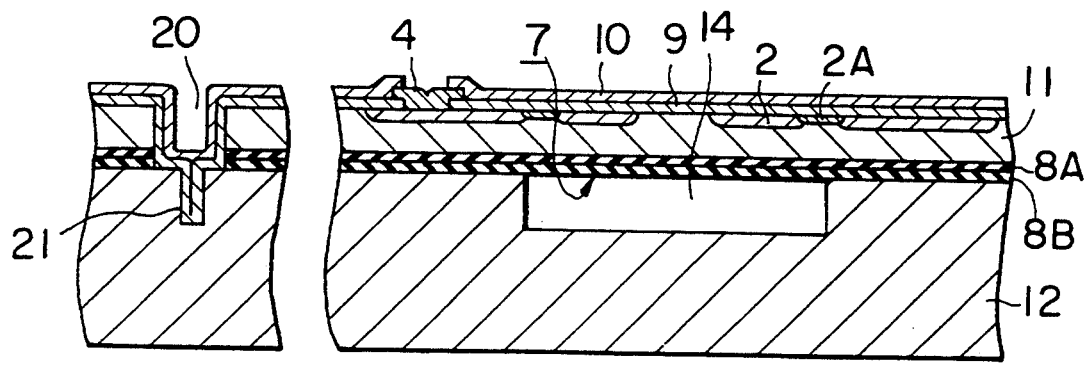
FIG. 29 is a side sectional view of a semiconductor pressure sensor having a recess in the first silicon substrate and also having a second silicon substrate bonded to the first silicon substrate with a two-layer interface insulating film interposed therebetween.
Figure 30:
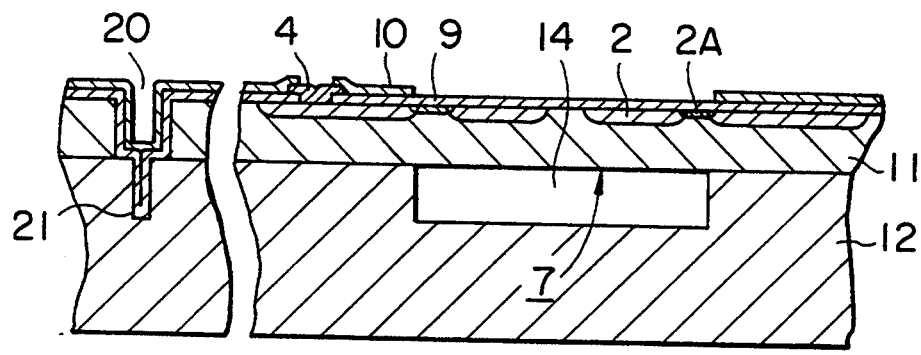
FIG. 30 is a side sectional view of a semiconductor pressure sensor having a glass coating over substantially the whole of a primary surface of the second silicon substrate except for the location above the vacuum chamber.
Figure 31:
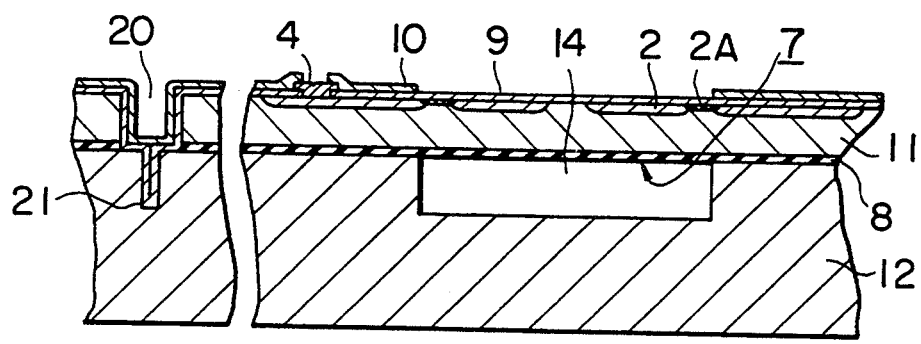
FIG. 31 is a side sectional view of a semiconductor pressure sensor having a glass coating over substantially the entire primary surface of the second silicon substrate except for the location above the vacuum chamber, and also having a first silicon substrate bonded to the second substrate with an interface insulating film interposed therebetween.
Figure 32:
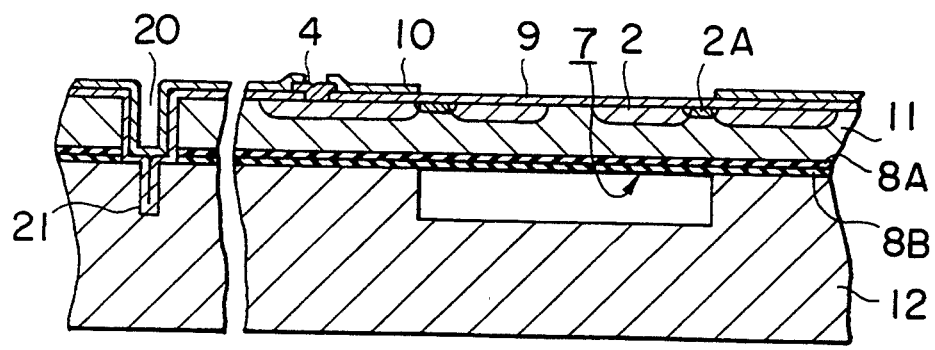
FIG. 32 is a side sectional view of a semiconductor pressure sensor having a glass coating over substantially the entire primary surface of the second silicon substrate except for the location above the vacuum chamber, and also having a first silicon substrate bonded to the second substrate with a two-layer interface insulating film interposed therebetween.
Figure 33:
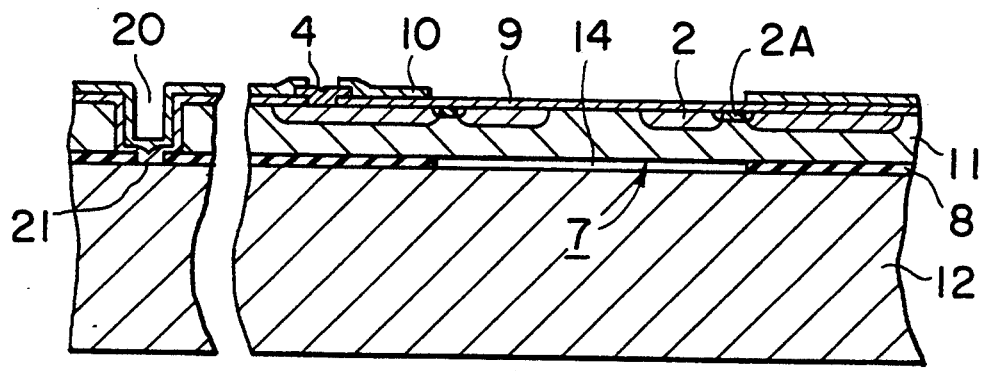
FIG. 33 is a side sectional view of a semiconductor pressure sensor having a glass coating over substantially the entire primary surface of the second silicon substrate except for the location above a vacuum chamber defined in an interface insulating film.
Figure 34:
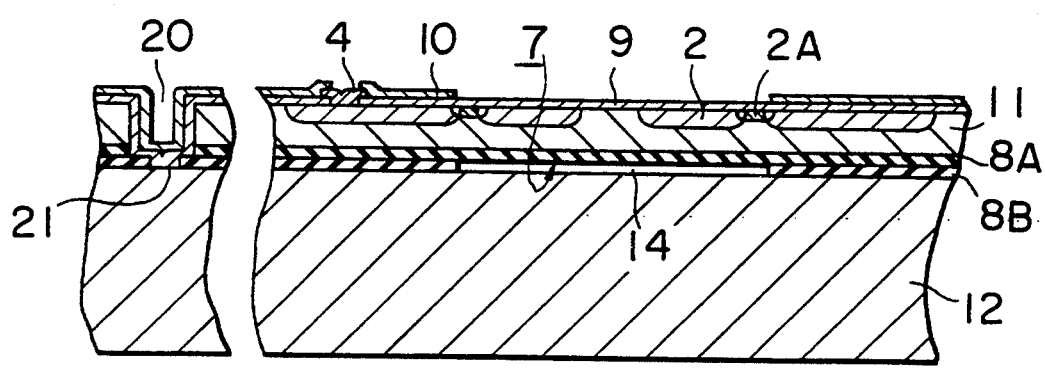
FIG. 34 is a side sectional view of a semiconductor pressure sensor having a glass coating over substantially the entire primary surface of the second silicon substrate except for the location above a vacuum chamber in one of the two layers constituting a two-layer interface insulating film.
Figure 35:
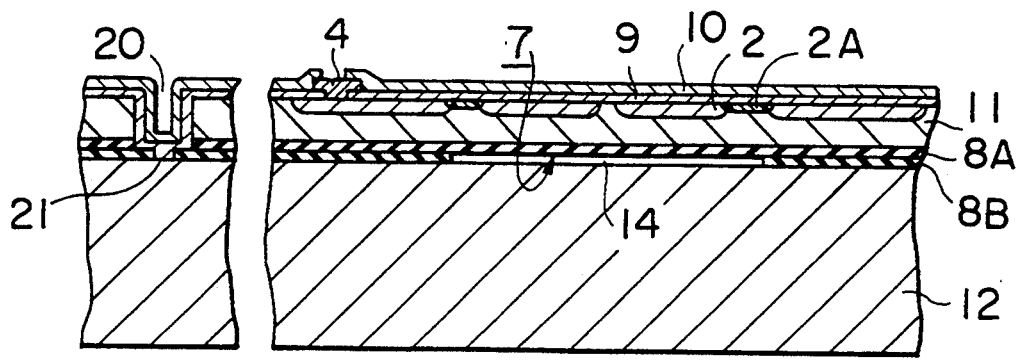
FIG. 35 is a side sectional view of a semiconductor pressure sensor having a vacuum chamber in one of the two layers constituting a two-layer interface insulating film, and also having a glass coating over substantially the entire primary surface of the second silicon substrate.
Figure 37:
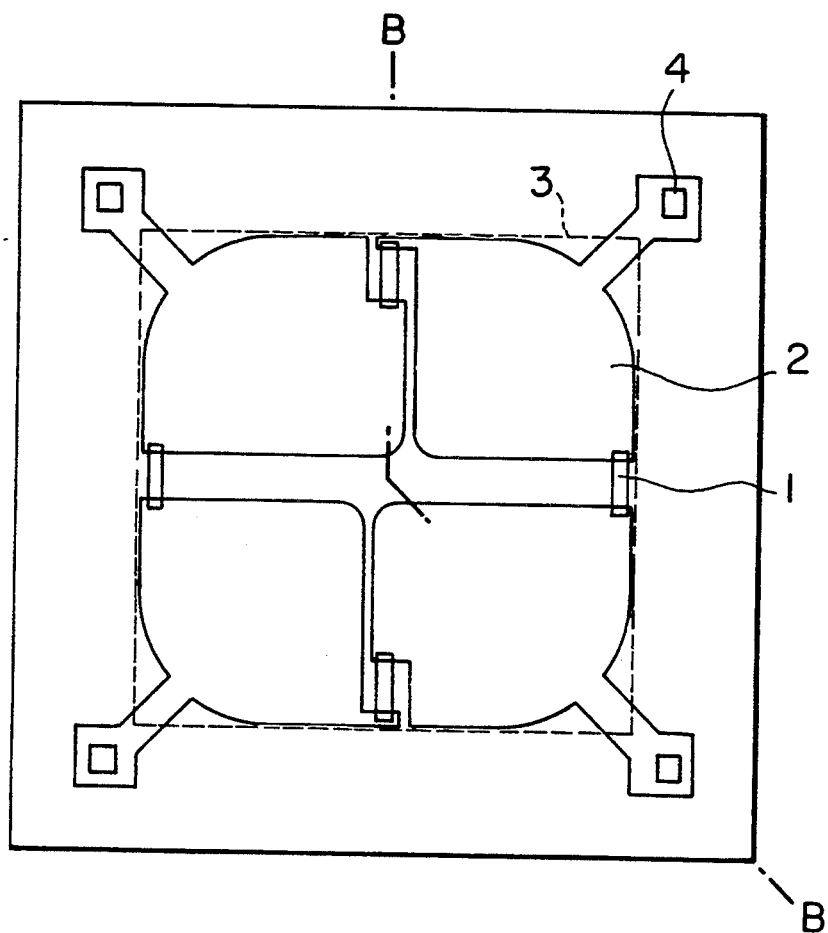
FIG. 37 is a plan view of a conventional semiconductor pressure sensor.
Figure 38:
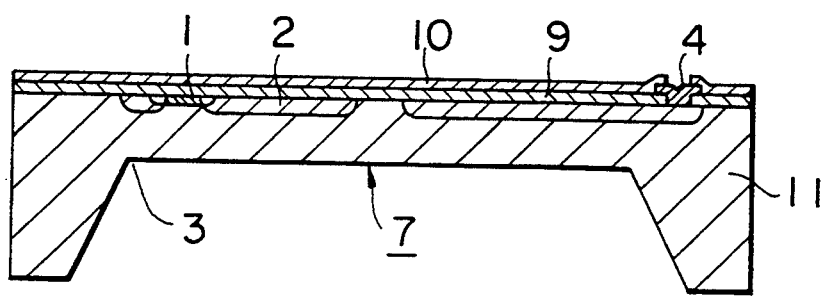
FIG. 38 is a side sectional view of the sensor shown in FIG. 37, which is taken along the line B—B shown in FIG. 37.
Figure 39:
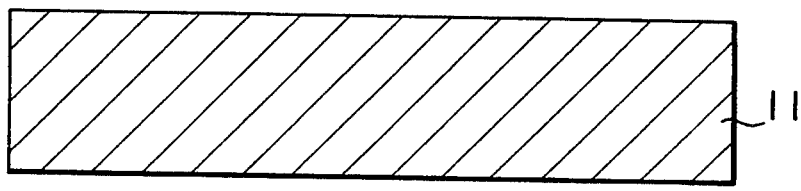
Figure 40:
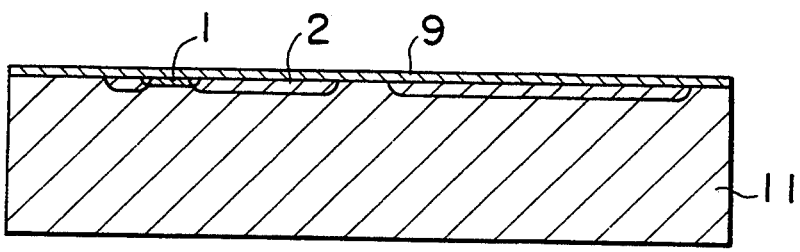
Figure 41:
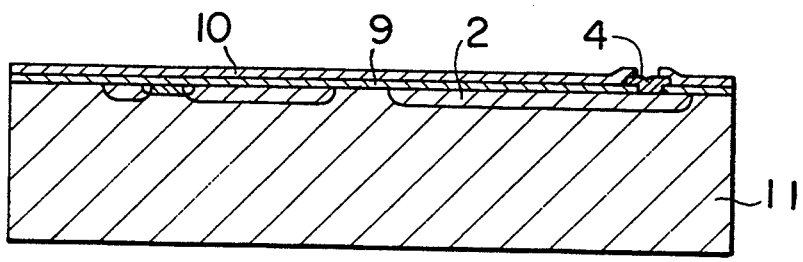
Figure 42:
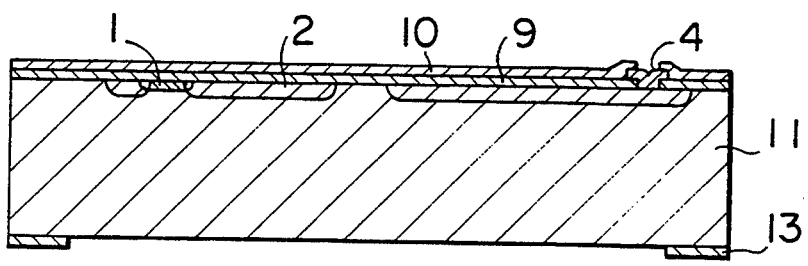

The interface insulating film 8 and the silicon oxide film 9 respectively formed on the secondary and the primary surfaces of the second silicon substrate 11 are films which are necessary to the production of the semiconductor pressure sensor. In order to achieve better sensor characteristics, the films 8 and 9 on either surface of the second silicon substrate 11 may comprise films of the same material, as shown in FIGS. 29, 31 and 34. In this way, it is possible to have the influences of the films on either surfaces of the substrate 12 offset by each other. Since the films on the primary and the secondary surfaces of the second silicon substrate 11 can be formed in various combinations, as shown in FIGS. 27 to 35, it is possible to vary the desirable characteristics exhibited by the semiconductor pressure sensor.

Although in the above-described second embodiment the formation of alignment marks is described as applied to a substrate body for a semiconductor pressure sensor, the alignment mark formation may be similarly applied to other types of semiconductor devices if they have a body constructed by bonding together a plurality of substrates by. The alignment marks are used for correctly aligning a pattern to be formed on one of the substrates with a pattern already formed on the other. The second embodiment may be modified such that, as shown in FIG. 36, a certain number of alignment marks 21 may be formed in the interface insulating film 8 simultaneously with the formation of other patterns in such a manner that the marks 21 will be at corresponding positions of the outer peripheral portion of the second silicon substrate 11. The sensor shown in FIG. 36 is also distinguished in that a plurality of vacuum chambers 14 are formed between the first and second silicon substrates 12 and 11.

The semiconductor pressure sensor according to the present invention can be directly mounted on an associated stem without using a mount.

As described above, the semiconductor pressure sensor according to the present invention has a diaphragm which is flat and thin and the thickness of which is uniform, the diaphragm being formed by a simple process. Thus, the present invention provides a semiconductor pressure sensor which is small in size and highly precise. The sensor may include alignment marks for assuring precise alignment of the formation of circuitry on a substrate of the sensor.

With the method of producing a pressure sensor according to the present invention, it is possible to simply prepare a diaphragm which is flat and thin and the thickness of which is uniform. Thus, the method is capable of producing a semiconductor pressure sensor small in size and highly precise. The method may be adopted to bond substrates to each other utilizing alignment marks, thus precisely aligning the substrates.

What is claimed is:

1. A semiconductor pressure sensor comprising:
   a first silicon substrate having a primary surface and including a recess serving as a vacuum chamber;
   a second silicon substrate having a primary surface, circuitry disposed on said primary surface of said second silicon substrate comprising diffused resistors and diffused wiring, and a secondary surface bonded to said primary surface of said first silicon substrate;
   an interface insulating film interposed between said primary surface of said first silicon substrate and said secondary surface of said second silicon substrate; and
   a silicon oxide film disposed on said primary surface of said second silicon substrate to protect said device.

2. The sensor according to claim 1 wherein said interface insulating film includes two layers.

3. The sensor according to claim 1 wherein said interface insulating film is disposed on said first silicon substrate in the recess.

4. The sensor according to claim 1 comprising silicon oxide films disposed on at least one of said primary and secondary surfaces of said second silicon substrate.

5. The sensor according to claim 1 comprising a glass coating disposed on substantially all of said primary surface of said second silicon substrate.

6. The sensor according to claim 1 comprising a glass coating disposed on substantially all of said primary surface of said second silicon substrate except on a part opposite the vacuum chamber.

7. A semiconductor pressure sensor comprising:
   a first silicon substrate having a primary surface;
   a second silicon substrate having a primary surface, circuitry disposed on said primary surface of said second silicon substrate comprising diffused resistors and diffused wiring, and a secondary surface bonded to said primary surface of said first silicon substrate;
   an interface insulating film interposed between said primary surface of said first silicon substrate and said secondary surface of said second silicon substrate, said interface insulating film defining a vacuum chamber between said first and second silicon substrates and forming alignment marks;
   alignment mark observation windows disposed at positions of said second silicon substrate corresponding to respective alignment marks; and
   a silicon oxide film disposed on said primary surface of said second silicon substrate to protect said circuitry and said alignment mark observation windows.

8. The sensor according to claim 7 wherein said interface insulating film includes two layers.

9. The sensor according to claim 8 wherein a part of one of said two layers of said interface insulating film is missing, thereby defining said vacuum chamber.

10. The sensor according to claim 1 comprising a glass coating disposed on substantially all of said primary surface of said second silicon substrate.

11. The sensor according to claim 7 comprising a glass coating disposed on substantially all of said primary surface of said second silicon substrate except on a part of that primary surface opposite the vacuum chamber.

12. A method of producing a semiconductor pressure sensor comprising:
    forming a recess in a part of a primary surface of a first silicon substrate as part of a vacuum chamber;
    bonding part of said primary surface of said first silicon substrate to a primary surface of a second silicon substrate with an interface insulating film interposed between said primary surfaces with the recess at a central part of said surfaces;
    machining a second surface, opposite said primary surface, of said second silicon substrate until the thickness of said second silicon substrate is reduced to a predetermined diaphragm thickness;
    forming openings through certain portions of said second silicon substrate adjacent the recess, thereby exposing certain portions of said interface insulating film;
    etching the exposed portions of said interface insulating film, thereby providing access to the recess;
    closing the openings by depositing a film in the openings in a reduced-pressure ambient, thereby transforming the recess into a vacuum chamber;
    forming a silicon oxide film on a primary surface of said second silicon substrate which has been formed by machining; and
    fabricating, on said primary surface of said second silicon substrate, circuitry including diffused resistors and diffused wiring using said silicon oxide film as a mask, said silicon oxide film thereafter serving as a protective film.

13. A method of producing a semiconductor pressure sensor comprising:
    forming alignment mark observation holes on a first surface of a second silicon substrate;
    forming, on a primary surface of a first silicon substrate, a recess which is to constitute a vacuum chamber;
    forming, on said primary surface of said first silicon substrate, alignment marks having predetermined positions relative to said recess;
    bonding said primary surface of said first silicon substrate to said first surface of a second silicon substrate in a reduced-pressure ambient with an interface insulating film interposed between said bonded primary and first surfaces, the bonding causing said recess to be transformed into a vacuum chamber;
    machining said second silicon substrate at a second surface opposite said first surface to open alignment mark observation windows through which said alignment marks can be observed and to reduce the thickness of said second silicon substrate to a predetermined diaphragm thickness; and
    fabricating, on said second surface of said second silicon substrate which has been formed by said machining, circuitry including diffused resistors, diffused wiring, metal electrodes, and a surface protective film, said circuitry being disposed opposite the vacuum chamber.

14. A method according to claim 13 comprising forming said recess by removing a part of said interface insulating film.

* * * * *